F. B. MOREHOUSE

Feb. 17, 1931. CLOTHES WASHING MACHINE Re. 17,967

Original Filed Sept. 29, 1924

INVENTOR
FRANK B. MOREHOUSE.
BY White Prost & Kraus
HIS ATTORNEYS.

Reissued Feb. 17, 1931 Re. 17,967

UNITED STATES PATENT OFFICE

FRANK B. MOREHOUSE, OF SAN FRANCISCO, CALIFORNIA, ASSIGNOR TO TRAYWAY MFG. CO., A CORPORATION OF CALIFORNIA

CLOTHES-WASHING MACHINE

Original No. 1,599,023, dated September 7, 1926, Serial No. 740,431, filed September 29, 1924. Application for reissue filed August 23, 1928. Serial No. 301,666.

The invention relates to clothes washing machines and particularly to the impeller for agitating the clothes in the container in which they are washed.

An object of the invention is to provide a reversible or invertible impeller so that different washing actions may be produced on clothes of different fabrics.

Another object of the invention is to provide an impeller which may be readily connected to and disconnected from its drive shaft so that it may be readily inverted.

The invention possesses other advantageous features, some of which with the foregoing, will be set forth at length in the following description, where I shall outline in full that form of the impeller of my invention, which I have selected for illustration in the drawings accompanying and forming part of the present specification. In said drawings I have shown one form of impeller embodying my invention, but it is to be understood that I do not limit myself to such form, since the invention, as set forth in the claims, may be embodied in a plurality of forms.

Referring to said drawings.

Figure 1:
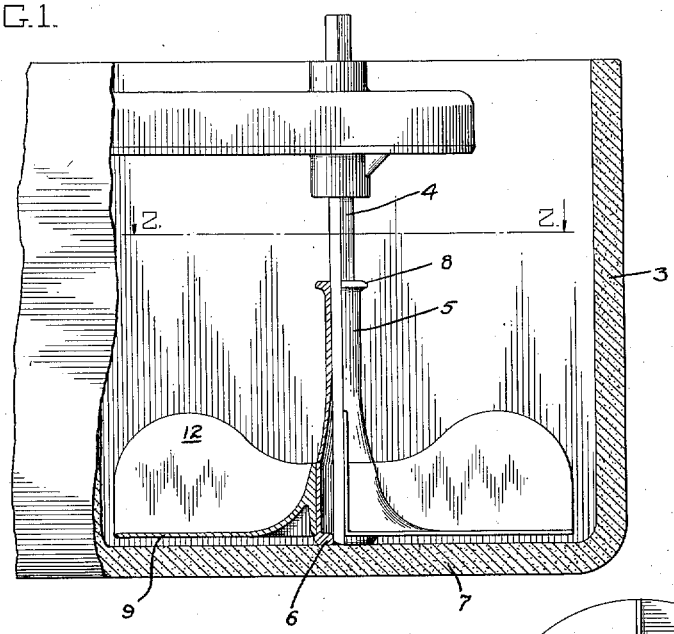
Figure 1 is a side elevation of a washing machine embodying my invention, a portion of the impeller being shown in section.
Figure 2:
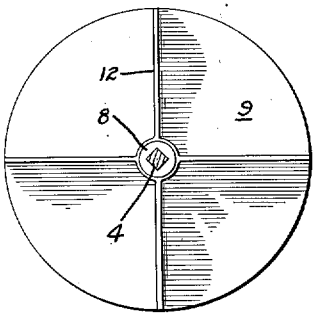
Figure 2 is a cross section taken on the line 2—2 of Fig. 1.

In the washing of fabrics, some fabrics, particularly heavy fabrics such as woolen and cotton fabrics should be submitted to a heavy agitation in the washing liquid. Other fabrics such as silks and laces, cannot withstand the heavy agitation and should be subjected to a light agitation in the washing liquid. In accordance with my invention I have provided a washing machine which may be readily adjusted to subject the fabrics to a heavy or light agitation, depending upon the nature of the fabric. In the present instance, this is accomplished by providing an impeller, which in one position will produce a heavy agitation and in the other position will produce a light agitation.

The clothes to be washed are placed in a suitable container such as the tray 3 with the washing liquid. The clothes and the liquid are agitated in the container 3 by an impeller which is rotated or reciprocated by the drive shaft 4 which is rotated or reciprocated by suitable mechanism. The drive shaft 4 is preferably square or rectangular and fits in a corresponding bore or socket in the drive mechanism, so that the shaft 4 is freely vertically movable with respect to the drive mechanism but is rotatable therewith.

The impeller comprises an elongated hub 5 which is preferably hollow and which is provided with an aperture or bore extending therethrough of a diameter greater than the drive shaft and into which the drive shaft 4 fits, so that the impeller is rotatable with the drive shaft and so that the drive shaft may be readily withdrawn vertically from engagement with the impeller.

The hub 5 of the impeller is provided on one end with a bearing surface 6 which is adapted to rest against the bottom 7 of the container when the impeller is in one position and on its other end is provided with a bearing surface 8 which is adapted to rest against the bottom of the receptacle when the impeller is inverted. Secured to or formed integral with the hub 5 adjacent the bearing surface 6 is a plate 9 which is preferably flat and circular and which lies adjacent to the bottom 7 of the receptacle when the bearing surface 6 is in contact with the bottom of the receptacle. Arranged on and disposed over the plate 9 are a plurality of vanes 12 which preferably extend radially with respect to the plate 9 and which produce the agitation of the clothes and washing liquid. The hub 5 extends upward above the upper edges of the vanes 12, preferably to such height that the plane of the upper edges of the vanes occurs approximately midway between the bearing surfaces 6 and 8.

Figure 3:
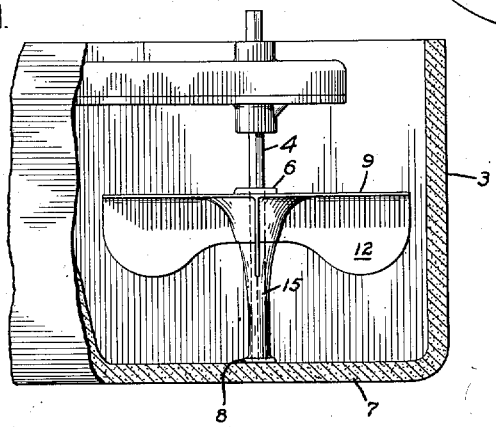
Figure 3 is an elevation of a washing machine embodying my invention, showing the impeller in inverted position.

In Figure 1, the impeller is shown in position with the vanes adjacent the bottom 7 of the receptacle and this is the position in which the impeller is used when it is desired to wash heavy fabrics. When it is desired to wash light fabrics, the impeller is inverted as shown in Figure 3, so that the plate 9 and the vanes 12 are spaced apart from the bottom 7 of the container, so that a lighter agitation is produced. When it is desired to invert the impeller, the drive shaft 4 is withdrawn vertically, the impeller is inverted and the drive shaft reinserted in the bore in the hub.

Having thus described the invention, what I claim as new and desire to secure by Letters Patent of the United States is:

1. In a clothes washing machine, a driving shaft, a hub reversible on said shaft, and adapted at either end to bear on said washing machine, and an impeller secured to one end of said hub.

2. In a clothes washing machine, a clothes agitator comprising a hollow elongated hub having an aperture of a greater diameter than the drive shaft extending therethrough, bearing surfaces at each end of said hub, a drive shaft disposed in said aperture and rotatably connected to said hub and an impeller secured to the hub at one end thereof.

3. In a clothes washing machine, an impeller comprising a plate, a plurality of vanes on the upper side of said plate, a hub to which the plate is secured extending upward above the vanes, said hub having an aperture of a greater diameter than the drive shaft extending vertically therethrough, bearing surfaces at each end of said hub, and a drive shaft removably fitted in said aperture.

4. In a clothes washing machine, a vertically disposed rotary drive shaft and a vertically reversible impeller removably engaging the drive shaft, said impeller comprising an elongated hollow hub having an aperture extending therethrough of a greater diameter than the drive shaft and into which the drive shaft extends, bearing surfaces at each end of said hub, and vanes secured to the hub and disposed adjacent one end thereof.

5. In a clothes washing machine adapted to wash clothes in a receptacle, a vertically disposed rotary drive shaft extending into the receptacle and a vertically reversible impeller removably engaging the drive shaft and normally resting on the bottom of the receptacle, said impeller comprising an elongated hollow hub having bearing surfaces at each end of said hub, into either end of which the drive shaft may extend and vanes secured to the hub and disposed adjacent one end thereof, so that when the impeller is in one position, the vanes are disposed adjacent the bottom of the receptacle and when the impeller is reversed the vanes are spaced from the bottom of the receptacle.

6. In a clothes washing machine adapted to wash clothes in a receptacle, a vertically disposed rotary drive shaft extending into the receptacle, a hollow hub removably engaging the drive shaft, bearing surfaces at each end of said hub, a plate secured to the hub at one end and vanes arranged on said plate, and projecting toward the other end of said hub, said hub having a bore extending entirely therethrough which is of greater diameter than the drive shaft, the hub consequently being invertible in the container so that in one position the plate lies adjacent the bottom of the receptacle with the vanes above the plate and in the inverted position, the plate is spaced away from the bottom and the vanes are disposed below the plate.

7. In a clothes washing machine, an impeller comprising an elongated hollow hub, a bearing surface on each end of the hub, a plate on one end of the hub and vanes on the upper side of the plate, the hub extending upward beyond the vanes.

8. In a clothes washing machine, an impeller adapted to be supported by the bottom of a receptacle, said impeller having a non-circular bore, and a vertical non-circular drive rod slidably engaging said bore whereby said drive rod may be disengaged by vertical movement of the same without lifting said impeller.

9. In a clothes washing machine, an impeller comprising an elongated hollow hub, a bearing surface on each end of the hub, a plate secured to said hub and vanes positioned on one side of the plate, one end of the hub extending beyond said vanes.

10. In a clothes washing machine, an impeller comprising a hub, a plate secured to said hub, and a plurality of vanes extending from one side of said hub, said hub having a bearing surface at one end thereof whereby the impeller may be supported by the bottom of a receptacle with the vanes extending upwardly, means permitting free vertical movement of the impeller for driving the same, said drive means permitting said impeller to be reversed whereby the impeller may be operated to ride above the clothes in the receptacle with the vanes extending downwardly.

11. In a washing machine, a tub, driving means extending within the tub, an agitator operatively connected to said driving means, adapted to occupy a position with an active face uppermost and relatively near the bottom of the tub and a position with an active face disposed downwardly and relatively near the top of the tub, and means for supporting the agitator in either of its positions.

12. In a washing machine, a tub, a drive shaft within said tub, an agitator reversibly mounted on said drive shaft and driven thereby, said agitator being movable with respect to said tub and drive shaft so that its bottom occupies a position adjacent the bottom of the tub and in a reverse position occupies a position adjacent the top of the tub.

13. In a washing machine, a tub, a drive shaft within said tub, an agitator reversibly mounted on said drive shaft and driven thereby, said agitator being movable with respect to said tub and drive shaft so that its bottom occupies a position adjacent the bottom of the tub and in a reverse position occupies a position adjacent the top of the tub, and means for supporting the agitator in either of its positions.

14. In a washing machine, a tub, a drive shaft within said tub, an agitator reversibly mounted on said drive shaft and driven thereby, said agitator being movable with respect to said tub and drive shaft so that its bottom occupies a position adjacent the bottom of the tub and in a reverse position occupies a position adjacent the top of the tub, and means for positively supporting the agitator in its position adjacent the bottom of the tub.

15. In a washing machine, a tub, a vertical oscillatory drive shaft within the tub, a disk-shaped agitator member slidably mounted on said shaft and driven thereby, agitating blades mounted on one face of said disk, said agitator being movable with respect to said tub and drive shaft so as to occupy a position adjacent the bottom of the tub with said blades extending upwardly and a reversed position adjacent the top of the tub with the blades extending downwardly.

In testimony whereof I have hereunto affixed my signature.

FRANK B. MOREHOUSE.